US011833870B2

(12) United States Patent
Hancock et al.

(10) Patent No.: US 11,833,870 B2
(45) Date of Patent: Dec. 5, 2023

(54) SWIVEL LEVELER WITH SPACER

(71) Applicant: Robust Acclaim Limited, New Plymouth (NZ)

(72) Inventors: Alastair Peter Hancock, Ferndale (NZ); Nicholas Paul David Jones, Inglewood (NZ); Glenn Dylan Catchpole, Inglewood (NZ); Andrew Nathan Beck, Omata (NZ); Wayne Brendon Morris, New Plymouth (NZ)

(73) Assignee: ROBUST ACCLAIM LIMITED, New Plymouth (NZ)

( * ) Notice: Subject to any disclaimer, the term of this patent is extended or adjusted under 35 U.S.C. 154(b) by 225 days.

(21) Appl. No.: 17/319,693

(22) Filed: May 13, 2021

(65) Prior Publication Data
US 2022/0363099 A1    Nov. 17, 2022

(51) Int. Cl.
*B60S 9/04*    (2006.01)
*B60D 1/66*    (2006.01)

(52) U.S. Cl.
CPC . *B60D 1/66* (2013.01); *B60S 9/04* (2013.01)

(58) Field of Classification Search
CPC ................. B60S 9/04; B60S 9/12; B60S 9/18
See application file for complete search history.

(56) References Cited

U.S. PATENT DOCUMENTS

| 1,603,307 | A | * | 10/1926 | Anderson | .......... | B23K 37/0461 |
| | | | | | | 248/185.1 |
| 5,395,098 | A | * | 3/1995 | Eickhorst | ............ | F16C 11/0604 |
| | | | | | | 269/21 |
| 6,575,443 | B2 | * | 6/2003 | Kick | ..................... | B25B 11/005 |
| | | | | | | 269/21 |
| 7,094,012 | B1 | * | 8/2006 | Bang | ........................ | B23Q 3/04 |
| | | | | | | 269/309 |
| 10,688,606 | B2 | * | 6/2020 | Endrullat | ........... | B23K 37/0408 |
| 2016/0176001 | A1 | * | 6/2016 | Rinaldi | .................. | B23Q 1/035 |
| | | | | | | 269/21 |
| 2022/0363099 | A1 | * | 11/2022 | Hancock | ................... | B60S 9/02 |

* cited by examiner

*Primary Examiner* — Lee D Wilson
(74) *Attorney, Agent, or Firm* — Steven Scott Lloyd; Gordon Feinblatt LLC

(57) ABSTRACT

The invention comprises a seating plate including a concentric swivel leveler to be used for leveling a trailer on an uneven ground surface by inserting a connected trailer jack into the swivel and establishing a stationary position wherein the trailer is substantially level. In certain embodiments, a spacer is also provided with a receiving well for the swivel such that a height of the seating plate above the ground surface is increased such that the trailer jack need not be extended as far as it would but for the spacer. A spacer may be of durable material and includes reinforcing support members help support large loads. In certain embodiments, the swivel may be fastened to the spacer using nuts, bolts and the like so the swivel may swivel about the receiving well while the seating plate maintains a height above the space top to allow for the swiveling action.

8 Claims, 6 Drawing Sheets

SWIVEL LEVELER WITH SPACER

STATEMENT REGARDING FEDERALLY SPONSORED RESEARCH OR DEVELOPMENT

The invention of the present disclosure was developed without federal funding.

BACKGROUND OF THE INVENTION

Trailers pulled behind a motor vehicle are typically equipped with a leveling means for use after detachment, sometimes referred to as a trailer jack. Trailer jacks are commonly included with various types of trailers, such as but not limited to recreational vehicle trailers, boat trailers, flatbed trailers, horse trailers, food truck trailers, and storage trailers. These trailer jacks typically employ a mechanical or hydraulic means for adjusting the height of the jack in order to situate the trailer substantially level when detached from a vehicle and stationary. It is a challenge for users of trailers and trailer jacks to level a trailer using a trailer jack when the trailer is to be parked on uneven ground surfaces, such as on sloped driveways, hills and the like, leading to the need to make or purchase additional equipment such as wheel chocks, which add cost and take up space.

Spacers have been employed to add to the useful length of the support members of trailer jacks common in the art, but while these spacers aid in establishing additional height at the front end of the trailer, they fail to achieve the result of establishing the trailer as level, which is an object of the invention of the present disclosure. Thus, even when spacers are used, the need for wheel chocks or other stabilizing means is not obviated. This has resulted in a long felt need in the art for an apparatus that can not only achieve a desired trailer front end height from the ground surface greater than that which may be achieved with a trailer jack alone, but also establish the trailer as level regardless of the evenness of the ground surface below the jack.

SUMMARY OF THE INVENTION

The invention of the present disclosure is that of an apparatus that acts as both a spacer and a leveler for a trailer jack as described above. The apparatus is operable on uneven ground surfaces for leveling the trailer, reducing the need for wheel chocks or additional stabilizing equipment.

The invention described herein employs a seating plate for receiving a lower end of a trailer jack, the seating plate comprising a swivel mechanism that allows for a trailer to be leveled when the lower end of the trailer jack is seated into the seating plate. The seating plate may be attached to the top of a spacer for a trailer jack, such as by being bolted into a provided recess in the top center of the spacer in a manner that allows for movement of the swivel when the trailer jack is seated therein in order to level the trailer.

In a preferred embodiment, an apparatus according to the present disclosure comprises a spacer made of durable material such as metal, graphite or thermoplastic, fabricated to include support members suitable to support the weight of the front end of a trailer having a trailer jack to be seated in an included seating plate of the apparatus. Preferably, an apparatus as described herein will include a supporting spacer base of greater width or diameter than the spacer top, with support members intervening between the top and the base for added strength. The spacer top may be further configured to include magnets for attracting the lower end of a metal trailer jack to a seating plate with swivel situated between the magnets and the lower end of the trailer jack.

The seating plate may be attached in a substantially central location at the spacer top, which may include a central recess for receiving the swivel of the seating plate, such as by the use of nuts, bolts and washers, or other suitable attachment means. A central support member may be provided for supporting the majority of the weight of the front end of the trailer being supported and leveled, with radial support members extending outward between the central support member and the inner wall of the spacer. Similarly, a seating plate according to the present invention may comprise radial support members extending outward from the swivel to the edges of the seating plate. Recesses may be provided in the spacer top for receiving magnets for attracting a metal lower end of a trailer jack into the seating plate above the swivel.

DETAILED DESCRIPTION OF THE INVENTION

Figure 1:
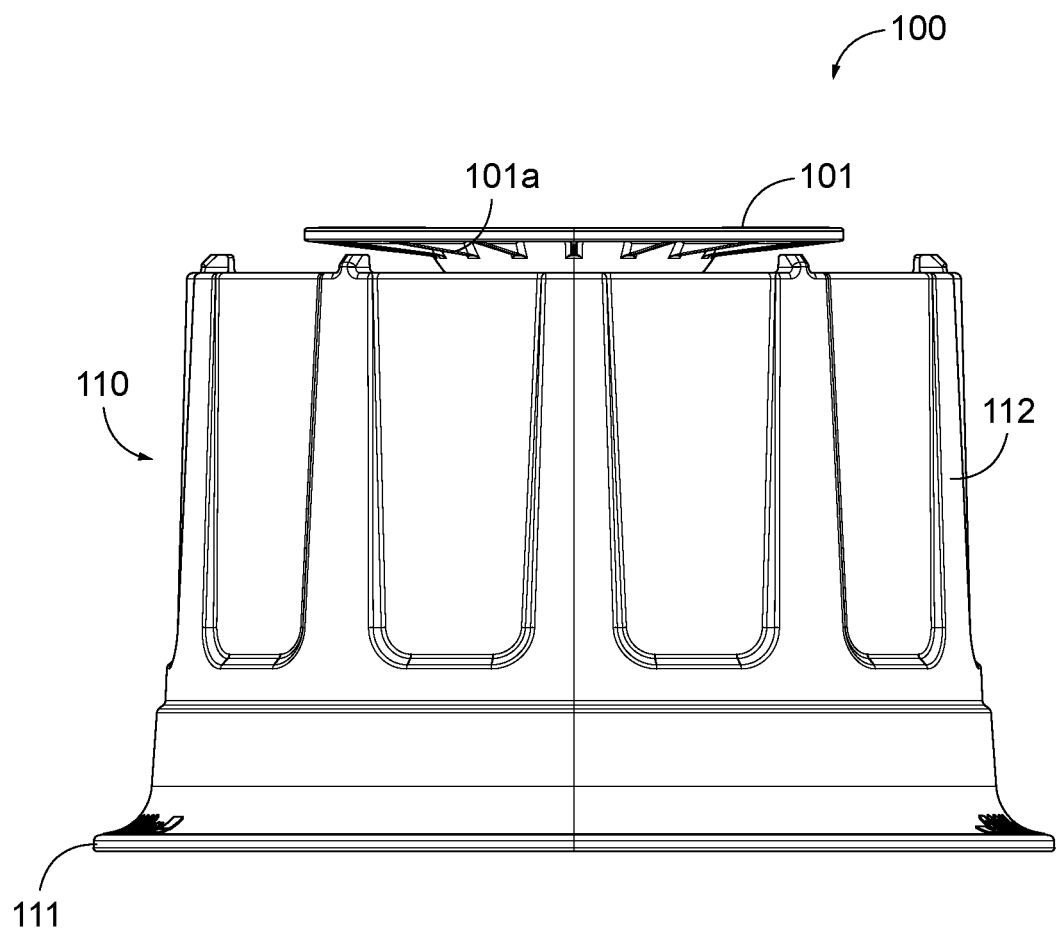
FIG. 1 illustrates a side view of an embodiment of a swivel leveler with spacer as described herein.

The invention of the present disclosure is best described with reference to the illustrative embodiments of the accompanying drawings. In FIG. 1, a side view of a swivel leveler with spacer 100 according to a preferred embodiment of the present invention is shown. A spacer 110 is shown as having a substantially cylindrical configuration with a spacer base 111 of greater diameter than the spacer top. The outer surface of a spacer 110 according to the present invention may include reinforced outer support members 112 for greater strength and stability. A seating plate 101 with swivel may also be reinforced with radial plate support members 101a for greater strength and stability.

Figure 2:
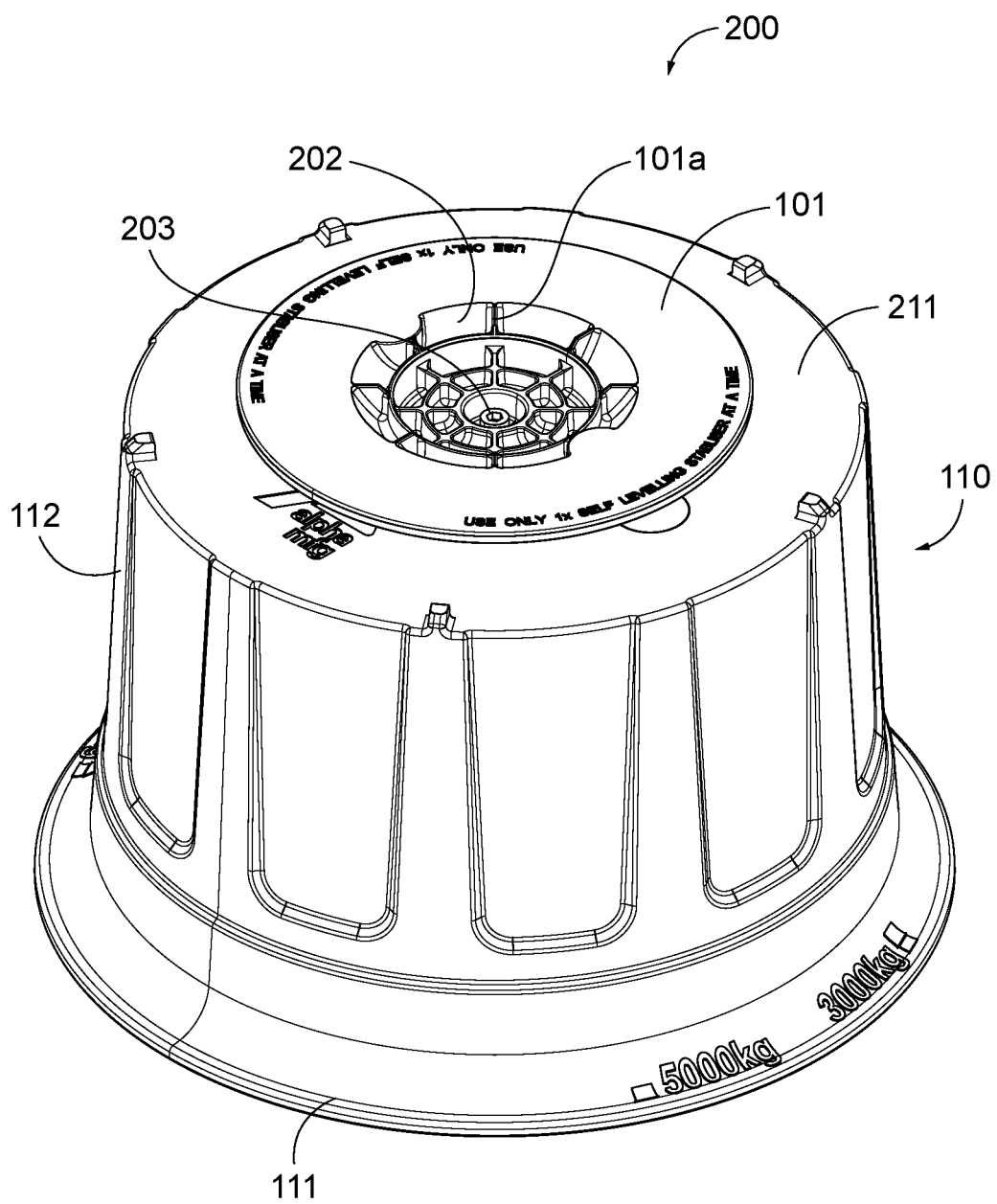
FIG. 2 illustrates a top perspective view of a swivel leveler with spacer according to an embodiment of the present invention.

FIG. 2 provides a top perspective view of a swivel leveler with spacer 200 similar to that shown from side view in FIG. 1. Turning to FIG. 2, a spacer 110 comprising outer support members 112 and spacer base 111 further comprises a spacer top 211 of durable material, capable of receiving a swivel 202 of a seating plate 101. A seating plate 101 may include radial plate support members 101a, and may be affixed to the spacer top 211 such as by using a bolt 203 and nut (not shown). While the substantially cylindrical configuration of FIGS. 1 and 2 represents a preferred embodiment of the present invention, one of ordinary skill in the art will appreciate that other configurations, such as square, rectangular, triangular or polygonal configuration are possible, as long as the spacer top is configured to securely receive the swivel of the seating plate so that the edges of the seating plate may move freely to level a lower end of a trailer jack received into the swivel, as is an object of the present invention.

Figure 3:
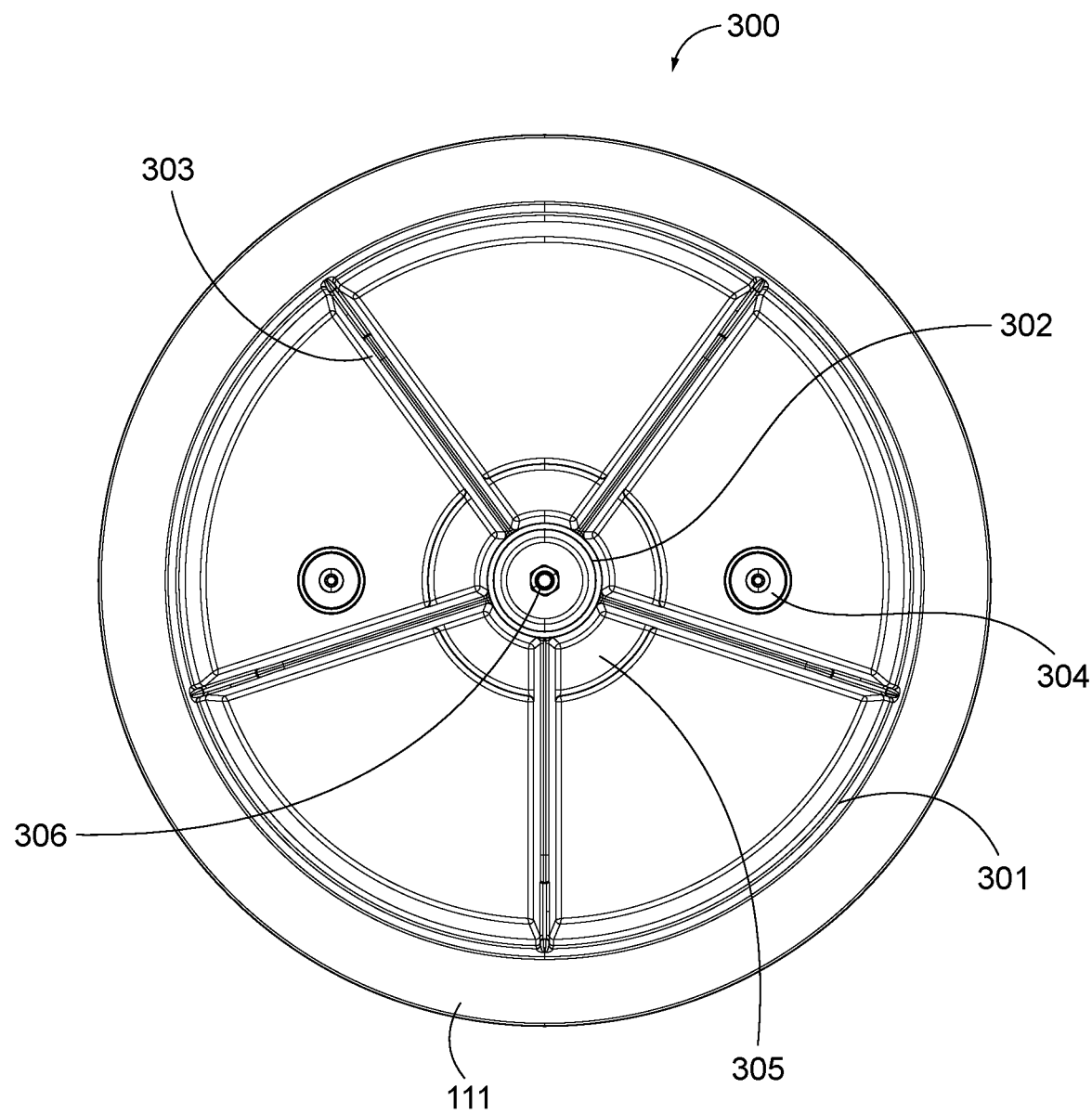
FIG. 3 illustrates a bottom view of a spacer according to an embodiment of the present invention, with magnets and swivel (not shown) attached above.

Turning now to FIG. 3, a bottom view of a spacer 300 according to the invention disclosure is shown to illustrate certain beneficial but optional features thereof. In this embodiment, a spacer base 111 is shown, which is larger in diameter than the spacer top. A central support 302 is provided, along with several radial supports 303, for added strength and stability. One of ordinary skill in the art will appreciate that the central support 302 and radial supports 303 may be incorporated to support greater trailer weight when in use than might otherwise be possible without these additional supports.

In a preferred embodiment, there are an odd number of radial supports 303, FIG. 3 representing an exemplary embodiment having five radial support 303. When downward pressure from the weight of a supported trailer is exerted upon the spacer top, the radial supports 303 are configured to twist such that when the maximum supported weight is applied to the spacer top, the circular central support 302 is able to reshape towards a substantially pentagonal shape, as the spacer is capable of compressing up to approximately one quarter of an inch. Only when greater downward force is applied to the spacer top than is required to compress the spacer to this degree will the spacer fail. Additionally, the preferred embodiment of FIG. 3, having five radial supports 303, is ideal for allowing space inside the central support 302 for a washer and nut 306 to be tightened over a bolt protruding downward into the central support 302, thereby fastening the spacer to a swivel according to the present invention.

The embodiment of FIG. 3 is further configured with recesses 304 for accessories such as rubber o-rings and magnets, which may be useful in attracting, for example, a metal lower end of a trailer jack, such that it may remain better seated in a seating plate of the present disclosure when in use. Also shown in the embodiment of FIG. 3 is a nut 306 for receiving a through-bolt, which may be used to fasten a swivel of a seating plate above as described with reference to the preceding figures. O-rings sit between the washer 402 and the spacer to ensure secure contact and even tension between the washer and spacer so in turn even tension between the swivel and spacer regardless of the angle of the swivel in relation to the spacer is maintained.

Figure 4:
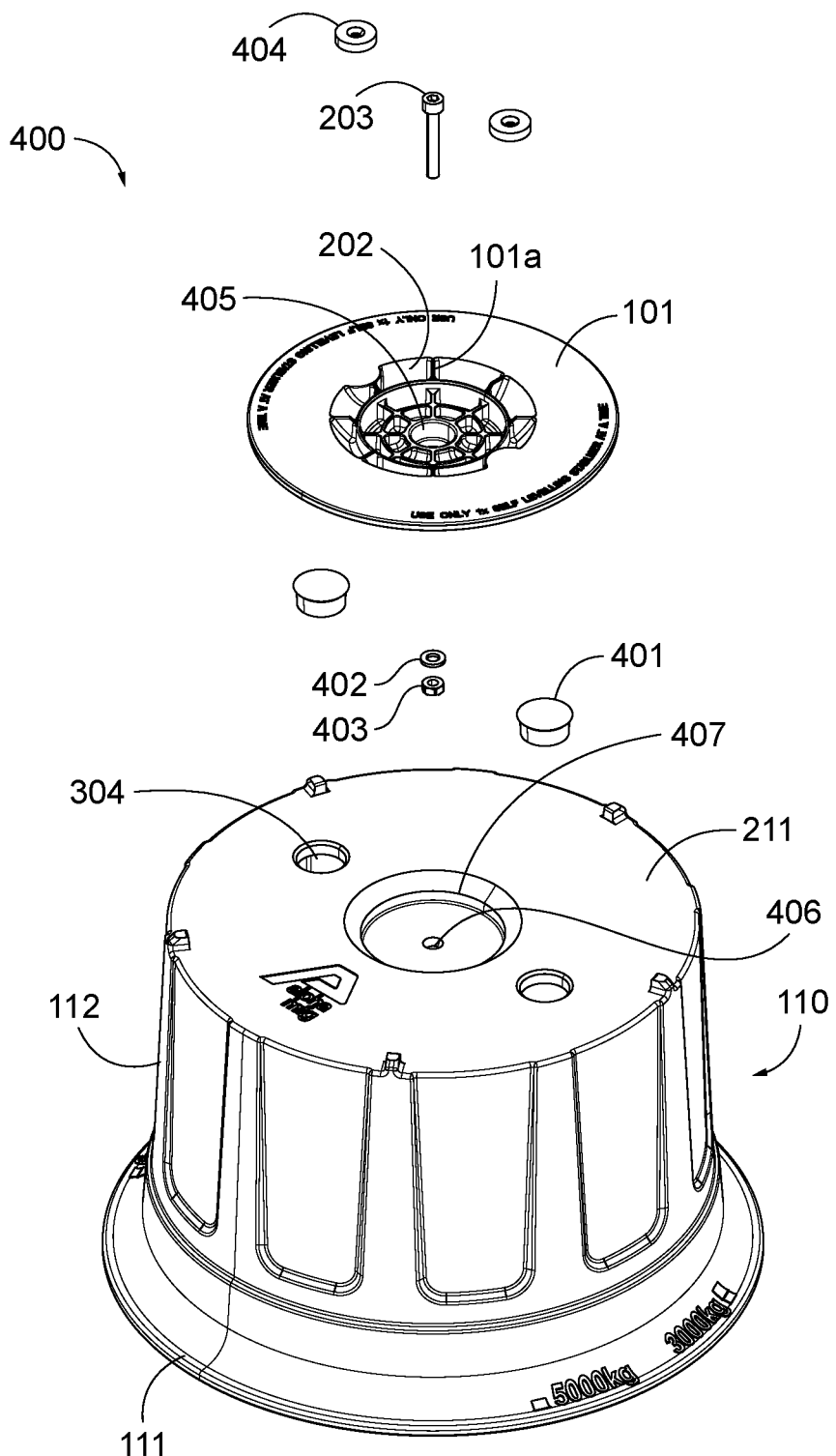
FIG. 4 illustrates an exploded top perspective view of an embodiment of the present invention, with spacer, magnets, seating plate with swivel and attachment means for the magnets and swivel shown.

FIG. 4 is provided to illustrate a top perspective expanded view of a swivel leveler with spacer 400 to better describe certain features that are not all visible when the apparatus is assembled for use. Beginning at the top, two swivel magnets 404 are provided and may be of suitable size and shape to be received within a swivel 202 of a seating plate 101 having radial plate support members. A bolt 203 is supplied which may be inserted through a swivel center bore 405 such that it may then be inserted through a spacer center bore 406 of a receiving well 407 of the spacer top 211, such that a washer 402 and nut 403 may be used to secure the bolt 203 tightly to the spacer 110.

Spacer magnet retainers/enclosures 401 are provided for attracting swivel magnets 404, which in turn serve to attract a metal lower end of a trailer jack when the apparatus illustrated in this embodiment is in use. The spacer top 211 is configured with recesses 304 for receiving spacer magnets 401 and their retainers/enclosures. When in place the retainers/enclosures keep the magnets in place and seal the magnets from moisture so they will not rust, and protect them from scratching and chipping. In the embodiment of FIG. 4, all of the magnets and recesses used to seat them within the swivel and spacer are substantially circular. However, one of ordinary skill in the art will appreciate that other sizes and shapes suitable for fitting within the appropriate locations of the apparatus may be used. Alternatively, the seating plate 101, swivel 202 or both may be constructed of magnetic material for attracting a metal lower end of a trailer jack when in use.

As in the other preferred embodiments illustrated herein, the spacer 110 of FIG. 4 is substantially cylindrical, with a spacer base 111 which is wider in diameter that the spacer top 211. The outer surface of the spacer 110 is configured with outer support members 112 for further reinforcement, improving the ability of the spacer 110 to support the weight of a trailer comprising a trailer jack for use with an apparatus according to the present disclosure. Again, one of ordinary skill in the art will appreciate other shapes and configurations are possible, and the illustrative embodiments of the drawings submitted with the application are not meant to be limiting in nature, but rather merely illustrative of the features and function of the invention of the present disclosure.

Figure 5:
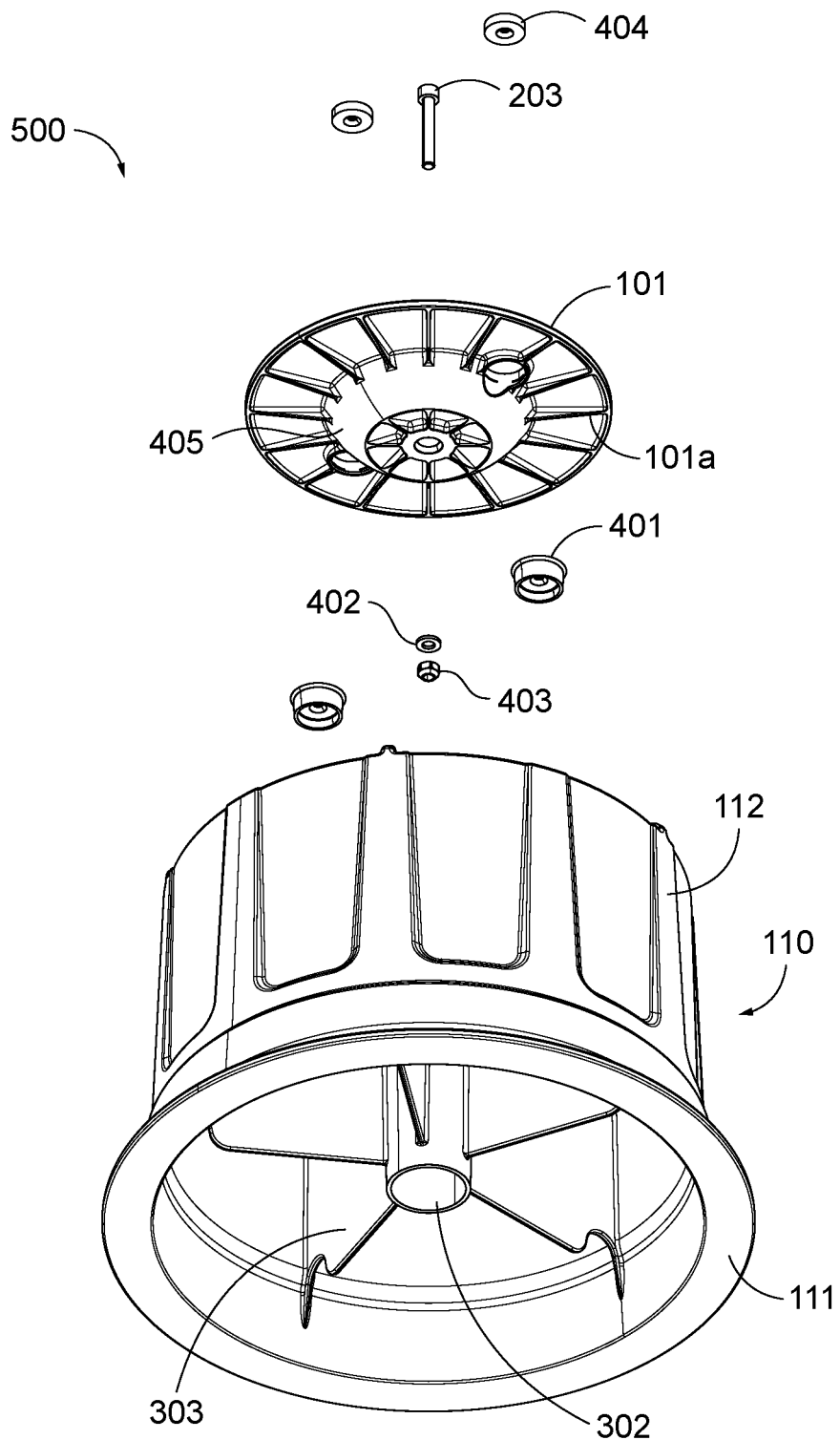
FIG. 5 illustrates an exploded bottom perspective view of an embodiment of the present invention, with spacer, magnets, seating plate with swivel and attachment means for the magnets and swivel shown.

An expanded bottom perspective view of a preferred embodiment of the present invention is illustrated in FIG. 5. Beginning at the bottom, a spacer 110 according to the present invention may be configured with a central support 302 and several radial supports 303 radiating outward from the central support 302 and terminating at the inner surface of the spacer 110. Combined with the outer support members 112, these features add strength and stability to the spacer 110, allowing it to support more weight than it otherwise might. As in other figures, a spacer base 111 is wider in diameter than the spacer top. Also shown in this view are swivel magnets 404, a bolt 203, a seating plate 101 having radial plate support members 101a and a center bore 405 of a swivel 202 of the seating plate 101. Additionally, spacer magnets 401 are provided for insertion into the spacer top, and a nut 403 and washer 202 are provided for securing the bolt 203 through the swivel center bore 405 and spacer center bore (not shown), tight to the spacer top.

Figure 6:
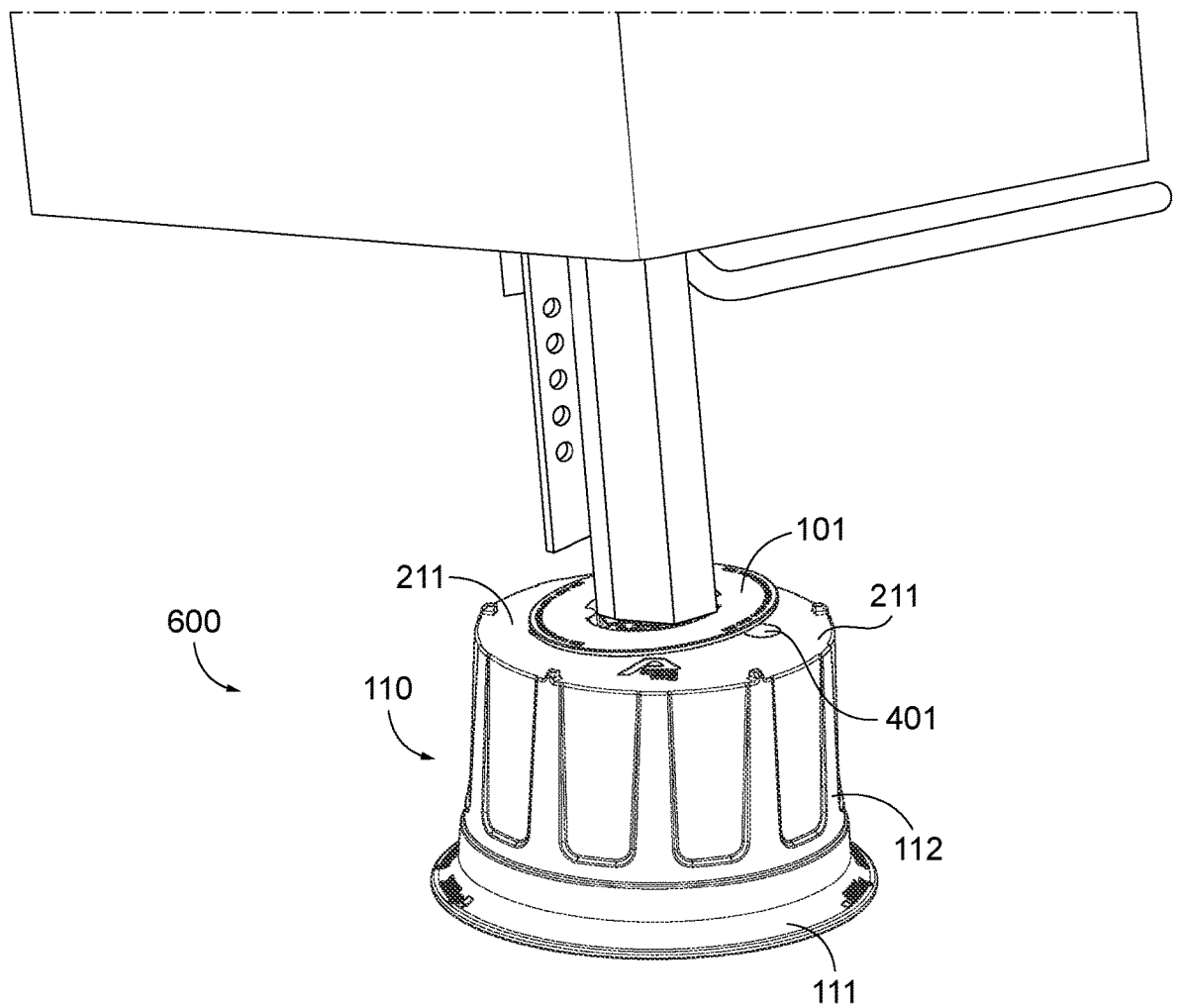
FIG. 6 illustrates a swivel leveler with spacer according to the invention of the present disclosure in use, with the lower end of a trailer jack seated above the swivel.

FIG. 6 is provided to illustrate a swivel leveler with spacer 600 in use with a trailer jack. Features previously described and identified in FIG. 6 include a seating plate 101, spacer top 211, spacer magnet 401, outer support members 112 and spacer base 111 of a spacer 110 as described herein. A trailer jack is inserted into the swivel portion of the seating plate, where it may be optionally secured further with the addition of space magnets 401 and swivel magnets. Because the seating plate comprises a swivel fastened to the spacer, a trailer jack may be set at different angles relative to the spacer top, the angles being determined by the ground surface on which the spacer 110 is positioned. In FIG. 6, a surface beneath the spacer may be inclined upward away from the front of the trailer jack. In response, the seating plate 101 tilts back about the swivel to offset the incline and level the connected trailer.

Any owner of a trailer or one of ordinary skill in the art will appreciate the benefits of the present invention, an object being the easy leveling of a trailer attached to a trailer jack by way of a seating plate comprising a swivel according to the present disclosure. Trailer owners may use a swivel leveler with spacer as described herein to park or store a trailer on a ground surface such as a street, driveway or ground surface and keep it level without the need for added equipment such as wheel chocks. The illustrative embodiments of the accompanying drawings are presented to aid in the description of the present invention, but one of ordinary skill in the art will appreciate the fact that other configurations are possible. As such, the description and drawings of the present disclosure are illustrative and not limiting, for the purpose of supporting the appended claims.

What is claimed is:

1. An apparatus for receiving a trailer jack and leveling a trailer attached thereto, the apparatus comprising a seating plate comprising a first outer edge and concentric swivel, wherein the swivel is configured to receive the trailer jack and swivel to a position wherein the trailer is substantially level and remains substantially stationary in the position, the apparatus comprising:
   a first center bore;
   a spacer having a spacer base and spacer top connected by at least one spacer wall and a second outer edge and concentric receiving well and second center bore, wherein the first center bore and second center bore are vertically aligned when the swivel is placed within the receiving well;
   a bolt inserted through the first center bore and then the second center bore; and
   a nut which may be fitted over a threaded end of the bolt and threaded thereon, wherein the nut may be tightened to secure the spacer to the swivel.

2. An apparatus for receiving a trailer jack and leveling a trailer attached thereto, the apparatus comprising a seating plate comprising a first outer edge and concentric swivel, wherein the swivel is configured to receive the trailer jack and swivel to a position wherein the trailer is substantially level and remains substantially stationary in the position, the apparatus comprising:
   at least two plate support members extending between the concentric swivel and the first outer edge from opposite sides of the concentric swivel;
   a first center bore;
   a spacer having a spacer base and spacer top connected by at least one spacer wall and a second outer edge and concentric receiving well and second center bore, wherein the first center bore and second center bore are vertically aligned when the swivel is placed within the receiving well;
   a bolt inserted through the first center bore and then the second center bore; and
   a nut which may be fitted over a threaded end of the bolt and threaded thereon, wherein the nut may be tightened to secure the spacer to the swivel.

3. The apparatus of claim 1, wherein the spacer comprises a central support and at least two radial support members extending between the central support and the at least one spacer wall from opposite sides of the central support.

4. The apparatus of claim 2, wherein the spacer comprises a central support and at least two radial support members extending between the central support and the at least one spacer wall from opposite sides of the central support.

5. The apparatus of claim 3, wherein the spacer further comprises at least two outer support members forming part of the outer surface of the spacer wall on opposite sides thereof.

6. The apparatus of claim 4, wherein the spacer further comprises at least two outer support members forming part of the outer surface of the spacer wall on opposite sides thereof.

7. The apparatus of claim 5, wherein the spacer is substantially cylindrical and the spacer base has a diameter greater than that of the spacer top.

8. The apparatus of claim 6, wherein the spacer top further comprises at least one recess containing at least one removable magnet.

* * * * *